(12) United States Patent
Avey et al.

(10) Patent No.: US 12,129,964 B2
(45) Date of Patent: Oct. 29, 2024

(54) LUBRICATION DELIVERY FOR PUMP PACKING ASSEMBLY

(71) Applicant: GD Energy Products, LLC, Tulsa, OK (US)

(72) Inventors: Adam Bradley Avey, Tulsa, OK (US); Troy E. Wiegand, Fort Worth, TX (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 444 days.

(21) Appl. No.: 17/683,409

(22) Filed: Mar. 1, 2022

(65) Prior Publication Data

US 2023/0279991 A1 Sep. 7, 2023

(51) Int. Cl.
*F16N 13/10* (2006.01)
*F16N 13/22* (2006.01)

(52) U.S. Cl.
CPC ............. *F16N 13/10* (2013.01); *F16N 13/22* (2013.01)

(58) Field of Classification Search
CPC .......... F16N 13/10; F16N 13/22; F16N 29/02; F02C 7/06; F16J 15/162
USPC ....................................................... 184/127.1
See application file for complete search history.

(56) References Cited

U.S. PATENT DOCUMENTS

| | | | |
|---|---|---|---|
| 1,787,317 A * | 12/1930 | Labus ..................... | F16J 15/183 |
| | | | 277/516 |
| 2,216,107 A * | 10/1940 | Betzold .................. | F16J 15/186 |
| | | | 277/513 |
| 2,329,955 A * | 9/1943 | Summers ................. | F16J 15/28 |
| | | | 277/545 |
| 6,409,464 B1 * | 6/2002 | Fisher ..................... | F01D 25/18 |
| | | | 416/174 |
| 8,517,612 B2 * | 8/2013 | Metzger .................. | F16C 33/58 |
| | | | 384/475 |
| 9,441,541 B2 * | 9/2016 | Wotzak ............... | F16C 33/6674 |
| 9,989,083 B2 * | 6/2018 | Labbe ..................... | F16C 33/76 |
| 10,352,321 B2 * | 7/2019 | Byrne .................. | F04B 1/0404 |
| 10,451,114 B1 * | 10/2019 | Farnum ............... | F16C 33/6681 |
| 10,731,558 B2 * | 8/2020 | Schwendenmann .... | F01D 25/18 |
| 10,794,425 B2 * | 10/2020 | Sorlier ................ | F16C 33/1065 |
| 11,732,608 B2 * | 8/2023 | Charrier ................ | F16H 57/042 |
| | | | 184/6.11 |

(Continued)

*Primary Examiner* — Michael R Mansen
*Assistant Examiner* — Mark K Buse
(74) *Attorney, Agent, or Firm* — Edell, Shapiro & Finnan, LLC

(57) ABSTRACT

Techniques for delivering lubricant to a packing assembly of a fluid end of a reciprocating pump include delivering lubricant to a stuffing box that is housing a packing assembly or to a manifold disposed in or around the stuffing box. The lubricant configured to decrease friction between an interior surface of the packing assembly and a reciprocating component moving along the interior surface. Prior to delivering the lubricant to the interior surface of the packing assembly, the lubricant is diverted to multiple radial flow paths circumferentially spaced around a bore in which the packing assembly is disposed. The multiple radial flow paths lead to the interior surface of the packing assembly and the lubricant flowing through the multiple radial flow paths is metered at different flow rates based on a friction gradient across the interior surface of the packing assembly.

20 Claims, 8 Drawing Sheets

(56) References Cited

U.S. PATENT DOCUMENTS

| | | | |
|---|---|---|---|
| 2013/0283758 A1* | 10/2013 | Wotzak | F16C 33/58 |
| | | | 60/39.08 |
| 2016/0348522 A1* | 12/2016 | Labbe | F02C 7/28 |
| 2017/0234222 A1* | 8/2017 | Schwendenmann | F02C 7/06 |
| | | | 184/6.11 |
| 2017/0307061 A1* | 10/2017 | Gravina | F16H 57/0424 |
| 2019/0032718 A1* | 1/2019 | Shinohara | F02C 7/06 |
| 2021/0277997 A1* | 9/2021 | Orsi | F04B 39/0022 |

* cited by examiner ly used to deliver high-pressure fluids during earth drilling operations (i.e., drilling and/or fracking). In such arrangements, a sealing arrangement, often referred to as a packing arrangement or packing assembly, is provided between a pump casing and a reciprocating component (e.g., a plunger) to reduce the likelihood of leakage. The sealing arrangement also protects the reciprocating component from potential damage from any abrasive components that may be contained in the fluid being pumped. In at least some instances, lubrication is delivered to this sealing arrangement to minimize friction between the sealing arrangement and the reciprocating plunger.

LUBRICATION DELIVERY FOR PUMP PACKING ASSEMBLY

FIELD OF INVENTION

The present invention relates to the field of high-pressure reciprocating pumps and, in particular, to lubrication delivery techniques for packing assemblies installed in fluid ends of high-pressure reciprocating pumps.

BACKGROUND

High-pressure reciprocating pumps are often used to deliver high-pressure fluids during earth drilling operations (i.e., drilling and/or fracking). In such arrangements, a sealing arrangement, often referred to as a packing arrangement or packing assembly, is provided between a pump casing and a reciprocating component (e.g., a plunger) to reduce the likelihood of leakage. The sealing arrangement also protects the reciprocating component from potential damage from any abrasive components that may be contained in the fluid being pumped. In at least some instances, lubrication is delivered to this sealing arrangement to minimize friction between the sealing arrangement and the reciprocating plunger.

SUMMARY

The present application relates to techniques for delivering lubrication to a sealing arrangement installed in a fluid end of a high-pressure reciprocating pump. The techniques may be embodied as at least a method for delivering lubricant, a lantern ring for a packing assembly, a packing assembly, a manifold assembly, a stuffing box assembly, a fluid end, and/or a reciprocating pump. When embodied as a lantern ring, the lantern ring may be provided independent of any other elements of a packing assembly. Similarly, when the techniques presented herein are embodied as a packing assembly, the packing assembly may be provided independent of any other elements. Alternatively, a lantern ring and/or a packing assembly may be incorporated into a fluid end, a reciprocating pump, or a portion of one or both.

More specifically, in accordance with at least one embodiment, the present application is directed to a method for delivering lubricant to a packing assembly of a fluid end of a reciprocating pump. The method includes delivering lubricant to a stuffing box that is housing a packing assembly or to a manifold disposed in or around the stuffing box. The lubricant is configured to decrease friction between an interior surface of the packing assembly and a reciprocating component moving along the interior surface. Prior to delivering the lubricant to the interior surface of the packing assembly, the lubricant is diverted to multiple radial flow paths circumferentially spaced around a bore in which the packing assembly is disposed. The multiple radial flow paths lead to the interior surface of the packing assembly and the lubricant flowing through the multiple radial flow paths is metered at different flow rates based on a friction gradient across the interior surface of the packing assembly.

Among other advantages, metering the flow rate of lubricant based on a friction gradient provides more lubricant to areas of higher friction. In turn, this may limit the asymmetrical wear, if not the overall wear, experienced by a packing assembly and/or a reciprocating component (e.g., a plunger) which will extend the lifespan of these components. By comparison, without such metering, gravity may cause frictional forces acting on a portion of a packing assembly disposed beneath a reciprocating component to be greater than frictional forces acting on a portion of the packing assembly disposed above a reciprocating component. Then, the packing assembly, the reciprocating component, and/or any other component experiencing wear from such friction will only last as long as the portion or component experiencing the higher frictional forces.

In at least some embodiments, the diverting comprises diverting the lubricant around the packing assembly with a manifold assembly that extends around at least a portion of the bore. Then, the metering may be accomplished in any number of manners. As a first example, the metering may comprise metering the lubricant with injectors included in the manifold assembly. In such instances, the injectors are circumferentially spaced around the packing assembly and have different orifice diameters to create the different flow rates for the multiple radial flow paths. The orifice diameters could be created by injectors with different dimensions and/or by inserting orifice plugs of different dimensions, or another such element/part, into injectors. Additionally or alternatively, the metering may comprise metering the lubricant with any other portion of the manifold, e.g., by metering upstream of injectors and running individual lines of tubing with metered flows to the injectors.

Still further, as another example, the metering may comprise metering the lubricant with channels of the stuffing box. In such instances, the channels are circumferentially spaced around the bore in which the packing assembly is disposed and have different diameters to create the different flow rates for the multiple radial flow paths. In such embodiments, the diameters could be created by machining/forming channels with different dimensions and/or by inserting orifice plugs of different dimensions, or another such element/part, into the channels. As yet another example, the metering may comprise metering the lubricant with holes of a lantern ring included in the packing assembly. In such instances, the holes are circumferentially spaced around lantern ring and have different diameters to create the different flow rates for the multiple radial flow paths. In such embodiments, the diameters could be created by machining/forming holes with different dimensions and/or by inserting orifice plugs of different dimensions, or another such element/part, into the holes.

Still further, in some embodiments, the diverting comprises diverting the lubricant around the packing assembly with a lantern ring included in the packing assembly and the metering comprises metering the lubricant with holes of the lantern ring. In such instances, the holes are circumferentially spaced around the lantern ring and having different diameters to create the different flow rates for the multiple radial flow paths. Again, the diameters could be created by machining/forming holes with different dimensions and/or by inserting orifice plugs of different dimensions, or another such element/part, into the holes.

Overall, different arrangements may offer different advantages. For example, if the lantern ring diverts and meters flows of lubricant, a lantern ring of a preexisting packing assembly might be replaced with a lantern ring formed in accordance with the techniques presented herein to retrofit the preexisting packing assembly with the techniques presented herein. On the other hand, metering and/or diverting with a stuffing box may allow an end user to continue using preexisting packing assemblies. The stuffing box may also be more robust than a lantern ring and, thus, may provide accurate metering over a longer lifespan. Meanwhile, metering and/or diverting with a manifold assembly (whether with injectors or upstream of the injectors) may provide easy access to components that execute the techniques presented herein. e.g., for maintenance.

Still further, in some embodiments, the diverting directs the lubricant into zones circumferentially spaced around a lantern ring included in the packing assembly, and each of the zones includes one or more of the multiple radial flow paths. This may segregate lubricant moving at different flow rates and/or create different backpressures for each of the different radial flow paths. In any case, the different zones may ensure that lubricant flows at different flow rates, e.g., to match a friction gradient across the interior surface of the packing assembly.

In accordance with another embodiment, the present application is directed to a manifold assembly configured to deliver lubricant to a stuffing box of a fluid end of a reciprocating pump. The manifold assembly includes tubing and a plurality of injectors. The tubing is disposed around at least a portion of a bore of the stuffing box in which a packing assembly is disposed and is configured to divert the lubricant to multiple radial flow paths circumferentially spaced around the bore. The multiple radial flow paths lead to an interior surface of the packing assembly and the lubricant is configured to decrease friction between the interior surface of the packing assembly and a reciprocating component moving along the interior surface. The plurality of injectors fluidly couple the tubing to the multiple radial flow paths and the plurality of injectors or the multiple radial flow paths meter flows of the lubricant at different flow rates based on a friction gradient across the interior surface of the packing assembly. Thus, the manifold assembly may realize the advantages associated with metering flows of lubricant discussed above.

In some embodiments, at least two injectors of the plurality of injectors have different orifice diameters to meter the flows of the lubricant at the different flow rates. For example, the at least two injectors may include a first injector with a first orifice diameter and a second injector with a second orifice diameter that is smaller than the first diameter, and the first injector may be disposed at a position longitudinally below a position of the second injector. As a more specific example, the second position may be directly beneath the reciprocating component. In addition to or as an alternative to the injector arrangements, the tubing may be annular tubing. In such embodiments, the orifice diameters could be created by injectors with different dimensions and/or by inserting orifice plugs of different dimensions, or another such element/part, into injectors.

In some embodiments, the manifold assembly is part of a stuffing box assembly, which may also include a casing portion with a plurality of channels. The casing portion defines the bore in which the packing assembly may be installed. The plurality of channels is circumferentially spaced around at least a portion of the bore to define the multiple radial flow paths. In some of these embodiments, at least two channels of the plurality of channels have different diameters to meter the flows of lubricant at the different flow rates. For example, the at least two channels may include a first channel with a first diameter and a second channel with a second diameter that is smaller than the first diameter. Then, the first channel may be disposed at a position longitudinally below a position of the second channel. As a more specific example, the second position may be directly beneath the reciprocating component. In such embodiments, the diameters could be created by machining/forming channels with different dimensions and/or by inserting orifice plugs of different dimensions, or another such element/part, into the channels.

Overall, the aforementioned components and arrangements may allow the manifold assembly and/or the stuffing box assembly to execute the aforementioned methods and/or to realize the advantages discussed above in connection with the aforementioned methods.

According to yet another embodiment, the present application is directed to a lantern ring for a packing assembly configured to be installed in a stuffing box of a fluid end of a reciprocating pump. The lantern ring includes a main body and a plurality of holes. The main body has a lateral surface disposed between an upstream end of the lantern ring and a downstream end of the lantern ring. The plurality of holes is circumferentially spaced around the lateral surface and each hole of the plurality of holes defines a radial flow path to the interior surface of the lantern ring that is configured to direct a lubricant to an interior surface of the packing assembly. The lubricant is configured to decrease friction between the interior surface of the packing assembly and a reciprocating component moving along the interior surface. At least two holes of the plurality of holes have different diameters so that the at least two holes meter flows of the lubricant at different flow rates. Thus, the lantern ring may realize the advantages associated with metering flows of lubricant discussed above.

In some of these embodiments, the at least two holes are arranged based on a friction gradient across the interior surface of the packing assembly. Additionally or alternatively, the different diameters could be created by machining/forming holes with different dimensions and/or by inserting orifice plugs of different dimensions, or another such element/part, into the holes. Still further, the lantern ring may include a groove disposed in the lateral surface and the plurality of holes may be formed in the groove. Moreover, in some embodiments with a groove, the lantern ring includes a plurality of walls that divide the groove into radial zones, each of which includes one or more holes of the plurality of holes. Consequently, the lantern ring may execute the aforementioned methods and/or to realize the advantages discussed above in connection with the aforementioned methods.

These and other advantages and features will become evident in view of the drawings and detailed description.

BRIEF DESCRIPTION OF THE DRAWINGS

To complete the description and in order to provide for a better understanding of the present invention, a set of drawings is provided. The drawings form an integral part of the description and illustrate embodiments of the present invention, which should not be interpreted as restricting the scope of the invention, but just as examples of how the invention can be carried out. The drawings comprise the following figures.

Like reference numerals have been used to identify like elements throughout this disclosure.

DETAILED DESCRIPTION

Figure 1:
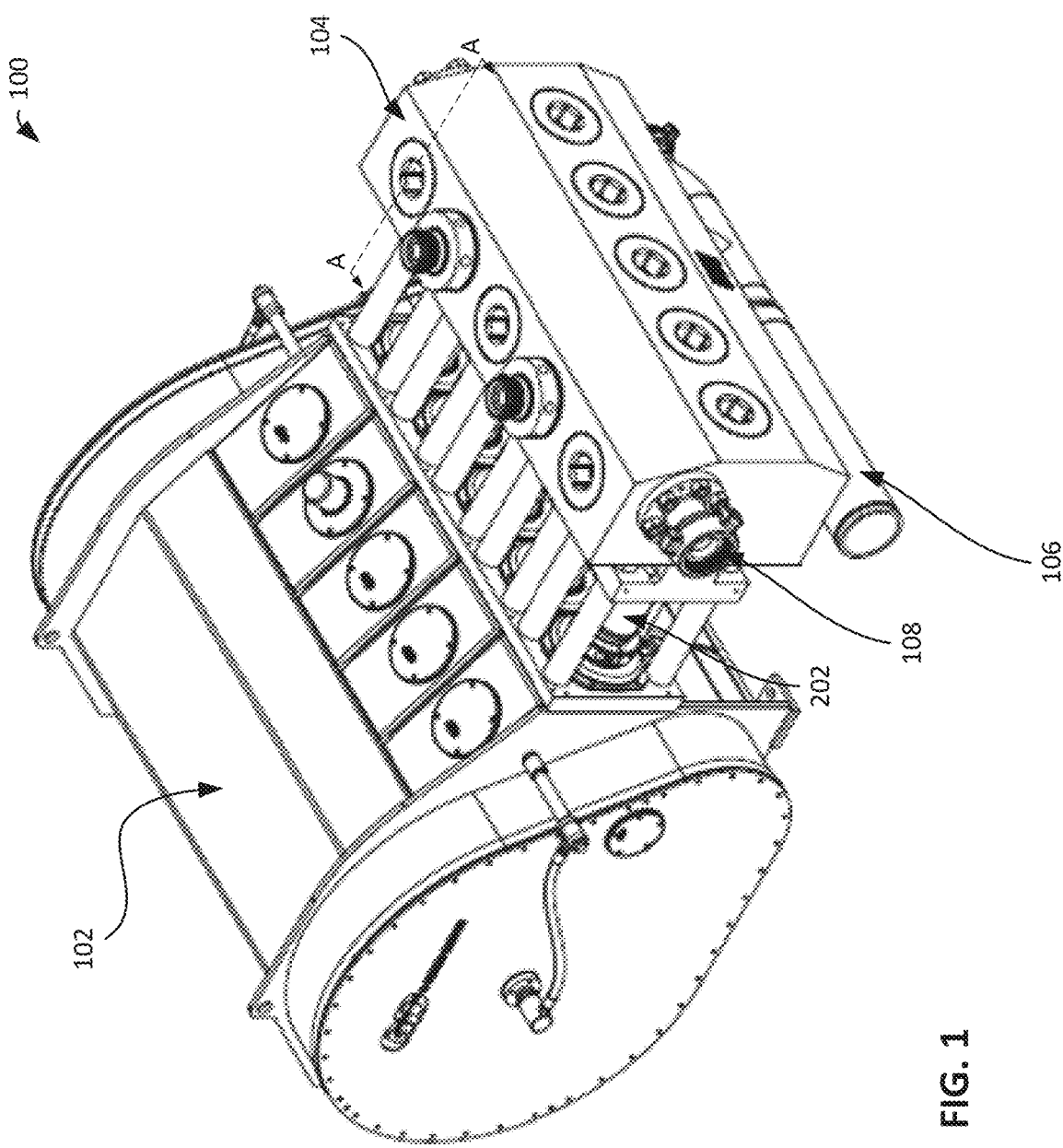
FIG. 1 is a perspective view of a reciprocating pump including a fluid end, according to an example embodiment.

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the techniques presented herein distribute packing lubricant preferentially around a reciprocating component, such as a plunger, during a pumping operation. That is, the techniques presented herein distribute different quantities or flow rates of packing lubricant to different radial locations of a packing assembly (which may surround and seal against a plunger) so that lubricant distribution is most preferential for friction conditions. More specifically, due to gravity, friction between a reciprocating component (e.g., a plunger) and a packing assembly, which occurs as part of normal sealing functions during high-pressure pumping operations, is often greater underneath the reciprocating component than it is above the reciprocating component. That is, gravity may create a gradient of friction forces. The techniques presented herein vary the injection rate of lubrication around the reciprocating component to compensate for and/or match this gradient of friction forces.

For example, the techniques may utilize a lantern ring where lubrication delivery holes (or orifice plugs that resize a hole) disposed above a reciprocating component define openings that are smaller than openings defined by lubrication delivery holes (or orifice plugs) below the reciprocating component. Since smaller holes create more resistance to flow and, thus, this arrangement will cause more lubricant to be delivered to the bottom of the reciprocating component, where frictional forces are typically relatively larger, prolonging the life of the packaging assembly. Additionally or alternatively, the techniques may vary the lubricant distribution by varying the sizes of radially extending channels in a stuffing box and/or by varying the sizes of injectors that deliver lubricant from a manifold to a stuffing box and/or a lantern ring (by varying the dimensions of such parts or inserting differently dimensioned parts, generally referred to herein as an orifice plug, into the channels and/or injectors). In any case, the techniques presented herein may also utilize a manifold that extends around at least a portion of a stuffing box and/or a bore included in the stuffing box. Thus, the manifold may deliver lubricant directly to radially extending flow paths of different sizes that are circumferentially spaced around the bore and/or a packing installed therein (with the flow paths being formed by a lantern ring, the stuffing box, and/or injectors of the manifold assembly).

By comparison, currently, packing lube is typically injected at a single point and is distributed circumferentially via a lantern ring with multiple equal sized injection holes. Such an arrangement tends to create an equal distribution of lubrication around a reciprocating component (e.g., a plunger). This is suboptimal in view of the gradient of friction forces created by the reciprocating component.

Now referring to FIG. 1 for a description of an exemplary embodiment of a reciprocating pump 100 in which the sealing assembly presented herein may be included. The reciprocating pump 100 includes a power end 102 and a fluid end 104. The power end 102 includes a crankshaft that drives a plurality of reciprocating plungers within the fluid end 104 to pump fluid at high pressure. Generally, the power end 102 is capable of generating forces sufficient to cause the fluid end 104 to deliver high-pressure fluids to earth drilling operations. For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting and the present application may be applicable to both fracking and drilling operations. In fact, any references to a "plunger" or fracking included herein are merely exemplary and are not intended to be limiting: the techniques presented herein can be used with any reciprocating component usable for pumping operations, whether for fracking or drilling.

Often, the reciprocating pump 100 may be quite large and may, for example, be supported by a semi-tractor truck ("semi") that can move the reciprocating pump 100 to and from a well. Specifically, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, especially typical "wear" components, and extend the time between maintenance operations (i.e., between downtime) are highly desirable.

Figure 2:
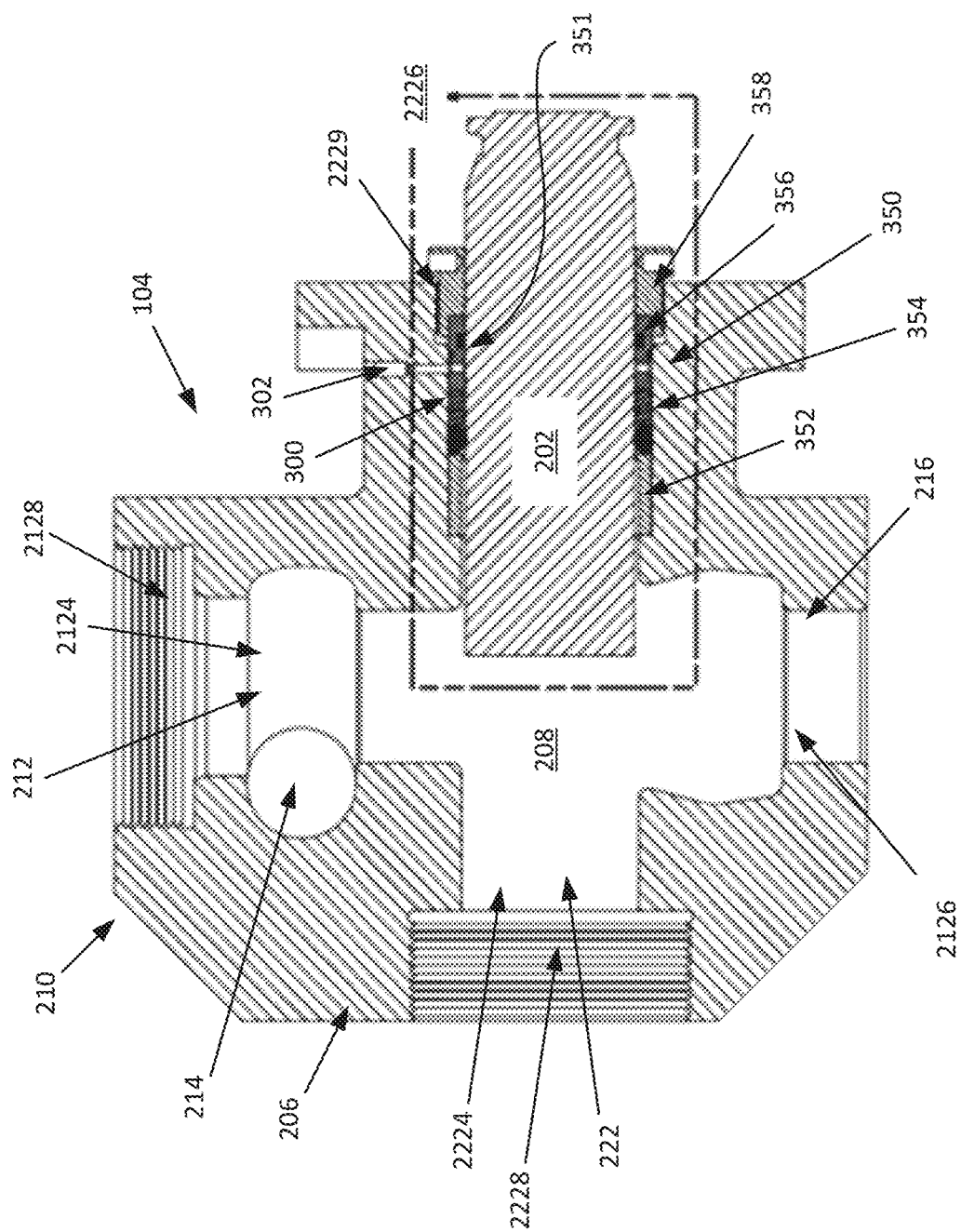
FIG. 2 is a cross sectional view taken along line A-A of FIG. 1.

FIG. 2 is a sectional view taken along line A-A of FIG. 1, which is representative of a central or plunger axis of one of the plungers 202 included in reciprocating pump 100. Generally, the fluid end 104 forms a plurality of pumping chambers 208 and each chamber 208 includes a plunger 202 that reciprocates within a casing 206 of the fluid end 104. With each stroke of the plunger 202, low-pressure fluid is drawn into the pumping chamber 208 and high-pressure fluid is discharged. Often, the fluid within the pumping chamber 208 contains abrasive material (i.e., "debris") that can damage seals formed in the reciprocating pump 100.

The pumping paths and pumping chamber 208 of the fluid end 104 are formed by conduits that extend through the casing 206 to define openings at an external surface 210 of the casing 206. More specifically, a first conduit 212 extends longitudinally (e.g., vertically) through the casing 206 while a second conduit 222 extends laterally (e.g., horizontally) through the casing 206. Thus, conduit 212 intersects conduit 222 to at least partially define the pumping chamber 208. As is illustrated, the diameters of conduit 212 and conduit 222 may vary throughout the casing 206 so that the conduits can receive various structures, such as valve assemblies, sealing assemblies, and/or components thereof.

Regardless of the diameters of conduit 212 and conduit 222, each conduit may include two segments, each of which extend from the pumping chamber 208 to the external surface 210. Specifically, conduit 212 includes a first segment 2124 and a second segment 2126 that opposes the first segment 2124. Likewise, conduit 222 includes a third segment 2224 and a fourth segment 2226 that opposes the third segment 2224. In the depicted embodiment, the segments of a conduit (e.g., segments 2124 and 2126 or segments 2224 and 2226) are substantially coaxial while the segments of different conduits are substantially orthogonal. However, in other embodiments, segments 2124, 2126, 2224, and 2226 may be arranged along any desired angle or angles, for example, to intersect pumping chamber 208 at one or more non-straight angles.

Figure 5:
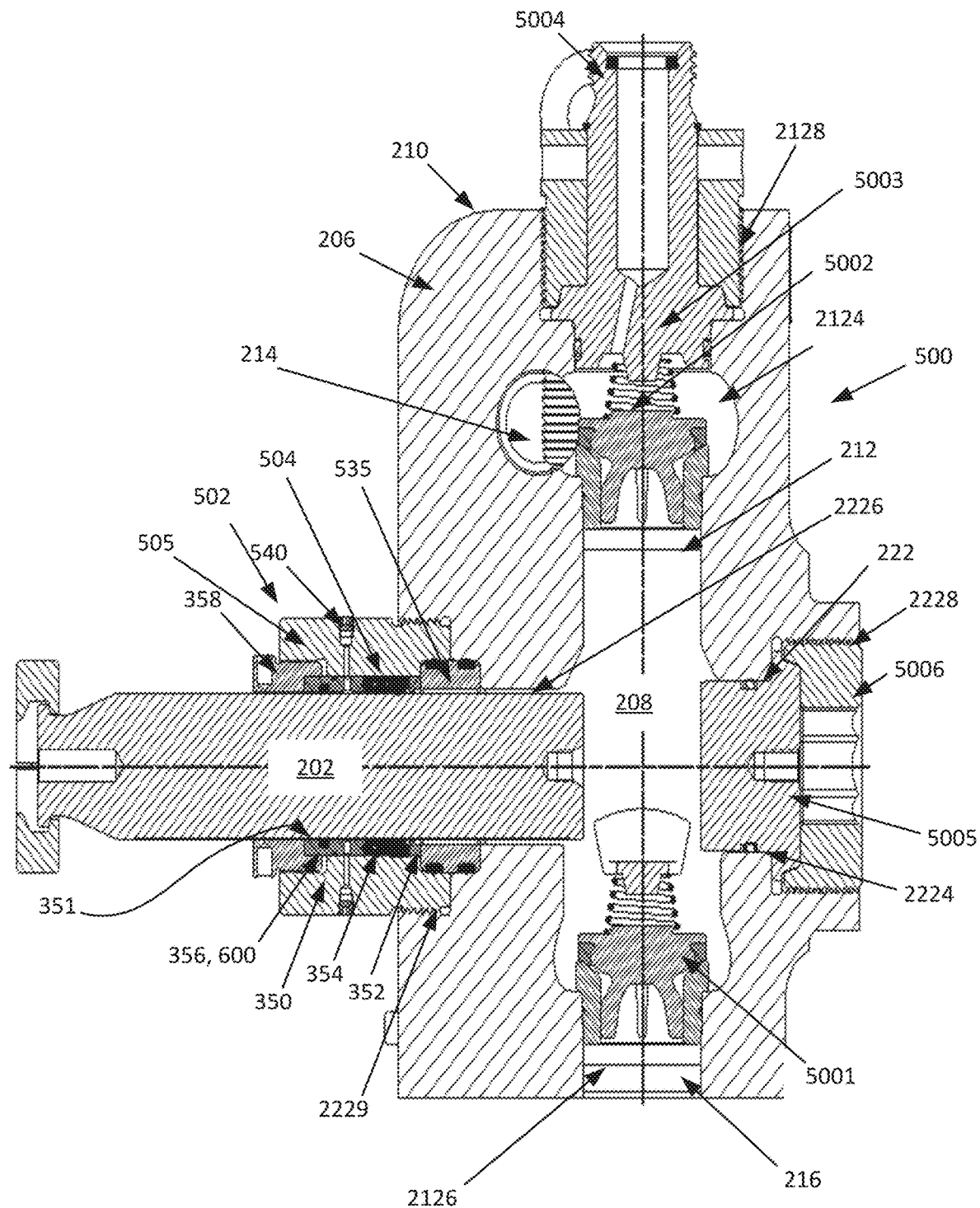
FIG. 5 is a cross sectional view of another fluid end that may form a part of reciprocating pump, according to an example embodiment.

Still referring to FIG. 2, in the depicted embodiment, conduit 212 defines a fluid path through the fluid end 104. Segment 2126 is an intake segment that connects the pumping chamber to piping delivering fluid to the fluid end 104. Meanwhile, segment 2124 is an outlet segment that allows compressed fluid to exit the fluid end 104. Thus, in operation, segments 2126 and 2124 may include valve components (e.g., one-way valves) that allow segments 2126 and 2124 to selectively open (e.g., as shown in FIG. 5). However, typically, valve components in the inlet segment 2126 may be secured therein by piping while valve components in outlet segment 2124 may be secured therein by a sealing assembly that, for example, is secured to and seals against an interior wall of casing 206 defining segment 2124.

Next, conduit 222 defines, at least in part, a cylinder for plunger 202 and/or connects the casing 206 to a cylinder for plunger 202. More specifically, in the depicted embodiment, segment 2226 defines a stuffing box 300 configured to receive a packing assembly 350 along which a reciprocating component, such as plunger 202, may reciprocate. As is described in further detail below, the packing assembly 350 is disposed around and seals against the plunger 202. Reciprocation of the plunger 202 in or adjacent to segment 2226 draws fluid into the fluid chamber 208 via inlet segment 2126 and pumps the fluid out of the fluid chamber 208 via outlet segment 2124. Finally, segment 2224 is an access segment that provides access to parts and surfaces disposed or defined within casing 206. However, in some embodiments, conduit 222 need not include segment 2224 and conduit 222 may be formed from a single segment (segment 2226) that extends from the pumping chamber 208 to the external surface 210.

In operation, segment 2124, segment 2224, and segment 2226 may be each be completely capped, sealed, plugged, or otherwise closed to prevent fluid from passing through one of these segments to the external surface 210 of casing 206. In segment 2124 and/or segment 2224, this seal may be achieved with a plug-style or plug-type sealing assembly. Meanwhile, as mentioned, segment 2226 may be sealed by a packing assembly 350 that extends around and seals (interiorly) against a plunger 202. In the embodiment depicted in FIG. 2, the packing assembly 350 also seals (exteriorly) against a stuffing box 300 because it is installed directly therein. However, in other embodiments, the packing assembly 350) may provide an exterior seal against a sleeve (not shown) disposed between the stuffing box 300 and the packing assembly 350. Moreover, in FIG. 2, the stuffing box 300 is fully defined by segment 2226 of the fluid end 104; but, in other embodiments, the stuffing box 300 may be defined, fully or partially, by one or more components that are attachable to a main body of the fluid end 104, an example of which is described below in connection with FIG. 5.

At a high-level, the packing assembly 350) includes a number of sealing and/or scraping elements that are generally denoted herein as packing elements 354. These packing elements 354 are axially secured within the stuffing box 300 by one or more junk rings 352 and a lantern ring 356, among other components. In the depicted embodiment, the packing elements 354 include three rings. However, this is merely an example and in other embodiments, packing elements 354 may include any number of rings in any order or combination and any of the rings may include any desirable features or structures. In any case, the one or more junk rings 352 are disposed upstream of the packing elements 354 while the lantern ring 356 is disposed downstream of the packing elements 354, between the packing elements 354 and a retaining element 358. Thus, the one or more junk rings 352 and the lantern ring 356 axially enclose (i.e., axially sandwich) the packing elements 354.

In the depicted embodiment, the retaining element 358 (also referred to as lock members, retaining nuts, etc.) is secured to the segment 2226 via threads 2229. Similarly, segment 2124 and segment 2224 include threads 2128 and threads 2228, respectively, disposed adjacent the external surface 210 of the casing 206. Thus, retaining elements, such as retaining element 358, may be threaded into place to secure packing assembly 350 in segment 2226 and to secure sealing assemblies into segment 2124 and segment 2224, e.g., during setup and/or servicing. However, in other embodiments, packing assembly 350 and/or sealing assemblies of other segments may be secured in their respective segments with any desired closing techniques. For example, fasteners, pressure, and/or additional closure components may be used, either in addition to or in lieu of threaded retaining elements, provided that the closing techniques allow for selective access to a segment for servicing and/or replacement of components.

Now, before the description of FIG. 2 continues, it is important to understand the terms "upstream" and "downstream." Any fluid flow through casing 206 flows through pumping chamber 208 and may contact a bottom or distal end of the packing assembly 350 or other such sealing assembly that forms a seal to close a segment (e.g., to prevent flow between the pumping chamber 208 and the external surface 210 of the casing 206). Thus, if a first component (or surface, portion, etc.) is described as being "upstream" of a second component (or surface, portion, etc.), the first component will be closer to the fluid flow (and high pressures associated therewith) than the second component (i.e., closer to pumping chamber 208). On the other hand, if a first component is described as being "downstream" of a second component, the first component will be closer to the external surface 210 of the casing 206 (and the relatively low pressures associated therewith) than the second component.

Still referring to FIG. 2, in this particular embodiment, the segment 2226 defines a single lubricant delivery channel 302 that connects the lantern ring 356 to the external surface 210 of the fluid end 104. In the embodiment of FIG. 2, the lantern ring 356 is configured to divert the lubricant from channel 302 around the plunger 202 and/or the bore in which plunger 202 is disposed while also directing the lubricant to an interior surface 351 of the packing assembly 350. Once the lubricant is delivered to the interior surface 351, it reduces the fiction between the interior surface 351 and a reciprocating component (e.g., plunger 202) that is in contact with (and moves against) the interior surface 351. As is explained in further detail below; in the embodiment of FIG. 2, the lantern ring 356 is configured to meter the flow of lubricant to the interior surface 351 at different rates at different radial locations around the plunger 202 and/or the bore in which plunger 202 is disposed. However, and as is described in further detail with FIGS. 5-11 below, in some embodiments, a stuffing box assembly may include multiple lubricant delivery channels and/or a manifold assembly configured to divert and/or meter flows of lubricant flowing radially inwards towards the interior surface 351 of a packing assembly.

Now referring to FIG. 2 in combination with FIG. 1, although FIG. 2 depicts a single pumping chamber 208, it should be understood that a fluid end 104 can include multiple pumping chambers 208 arranged side-by-side. In some embodiments, the fluid end 104 may be modular and different casing segments may house one or more pumping chambers 208. Additionally or alternatively, multiple pumping chambers 208 may be formed in a single casing segment or casing. Regardless of how the casing 206 is formed, the one or more pumping chambers 208 included therein are arranged side-by-side so that corresponding conduits are positioned adjacent each other and generate substantially parallel pumping action.

In operation, fluid may enter fluid end 104 via multiple openings, as represented by opening 216 in FIG. 2, and exit fluid end 104 via multiple openings, as represented by opening 214 in FIG. 2. In at least some embodiments, fluid enters openings 216 via pipes of a piping system 106 (see FIG. 1), flows through pumping chamber 208 (due to reciprocation of a plunger 202), and then flows through openings 214 into a channel 108 (see FIG. 1). However, piping system 106 and channel 108 are merely example conduits and, in various embodiments, fluid end 104 may receive and discharge fluid via any number of pipes and/or conduits, along pathways of any desirable size or shape.

Figure 3:
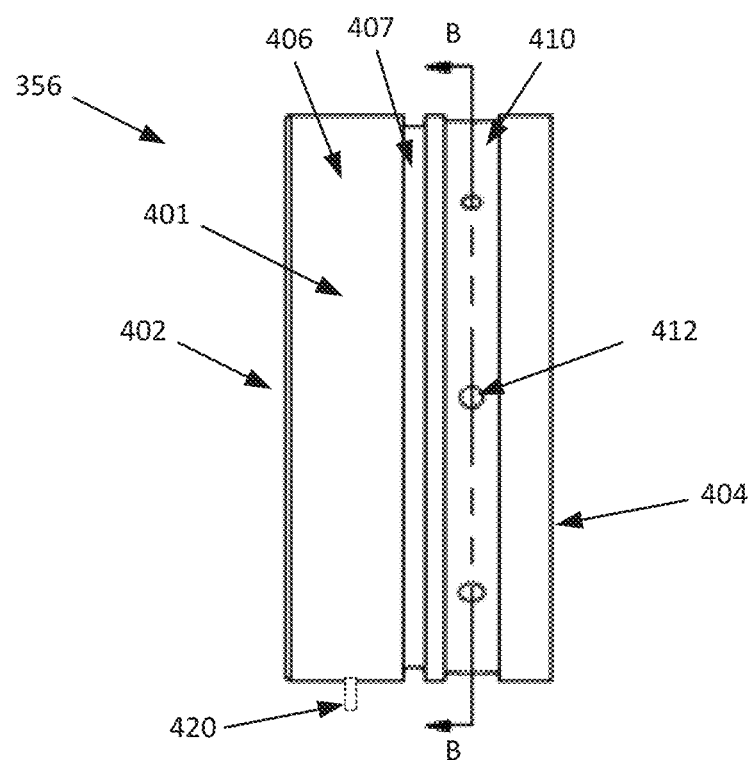
FIG. 3 is a side view of a lantern ring that may be included in a packing assembly for a stuffing box included in the fluid end of FIGS. 1 and 2 according to example embodiments, the lantern ring being formed in accordance with the techniques presented herein.
Figure 4:
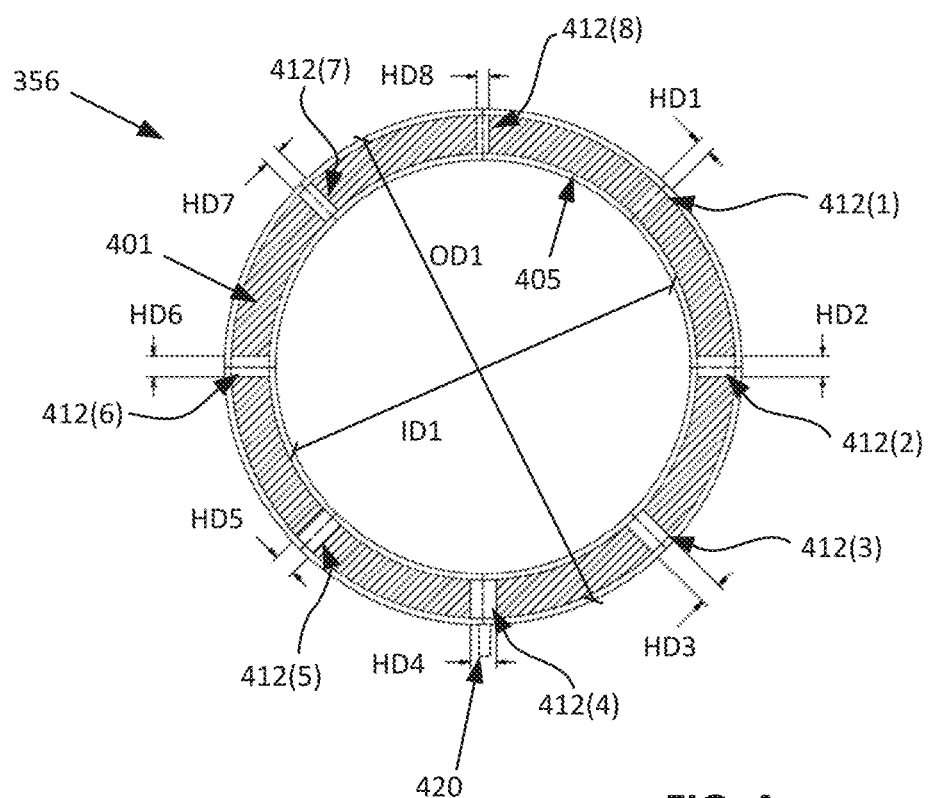
FIG. 4 is a side sectional view taken along line B-B of FIG. 3.

FIG. 3 and FIG. 4 depict a side view and a sectional view of the lantern ring 356 included in the embodiment of FIG. 2. Generally, the lantern ring 356 is an annular component that extends from a downstream end 402 to an upstream end 404. More specifically, the lantern ring 356 includes a main body 401 that extends from the downstream end 402 to the upstream end 404, The main body 401 also extends from an interior lateral surface 405 with an inner diameter ID1 to an exterior lateral surface 406 with an outer diameter OD1 that is larger than the inner diameter ID1. The interior lateral surface 405 is generally configured to face and engage a reciprocating component disposed within a packing assembly of which the lantern ring 356 is a part. Thus, inner diameter ID1 may be sized based on a diameter of the reciprocating component.

The exterior lateral surface 406 is generally configured to face a stuffing box (directly or with a sleeved therebetween) and, thus, includes or defines features configured to receive and distribute lubricant. Specifically, in the depicted embodiment, the exterior lateral surface 406 includes a lubricant groove 410 and a seal groove 407 disposed downstream of the lubricant groove 410 (e.g., between lubricant groove 410 and the downstream end 402 of the lantern ring 356). Thus, if a seal (e.g., an O-ring) is disposed in the seal groove 407, downstream of the lubricant groove 410, the seal may prevent lubricant from flowing towards and/or exiting from an external surface 210 of a fluid end and encourage lubricant to flow onto, over, or through the packing elements 354 including in a packing assembly 350 in which the lantern ring 356 is included.

The lubricant groove 410 is configured to receive lubricant from a lubricant delivery channel, such as channel 302, and divert the lubricant circumferentially around the exterior lateral surface 406. That is, lubricant groove 410 may form a flow path that extends circumferentially around the exterior lateral surface 406 of the lantern ring 356. Additionally, the groove includes circumferentially spaced holes 412 that extend from a bottom of the lubricant groove 410 and define multiple radial flow paths to an interior surface 351 of a packing assembly 350, which may be partially defined by the interior lateral surface 405 of the lantern ring 356. However, critically, these circumferentially spaced holes 412 are not identical; instead, holes 412 have different dimensions so that the circumferentially spaced holes 412 meter flows of the lubricant along the multiple radial flow paths at different flow rates. For example, the circumferentially spaced holes 412 may be sized based on a friction gradient across the interior surface 351 of the packing assembly 350, with larger holes aligned with higher friction areas and smaller holes aligned with lower friction areas.

For example, as is shown in FIG. 4, in the depicted embodiment the lantern ring 356 includes eight circumferentially spaced holes 412(1)-(8) and at least some of these holes have varied diameters HD1-HD8 so that the circumferentially spaced holes 412(1)-(8) meter flows of the lubricant along the multiple radial flow paths at different flow rates. However, other embodiments need not have eight holes and can have any number of holes. Moreover, in the depicted embodiment, the eight circumferentially spaced holes 412(1)-(8) are evenly spaced around the lubricant groove 410 (e.g., approximately 72 degrees between holes), but other embodiments need not include even spacing and can include any desired spacing.

Still further, in some embodiments, all of the circumferentially spaced holes 412(1)-(8) have different diameters; however, in other embodiments, only a subset of the circumferentially spaced holes 412(1)-(8) have different diameters. Additionally, although not shown, the different hole diameters need not be formed by machining holes of different sizes and, in at least some embodiments, can be formed by inserting annular orifice plugs into predefined holes (e.g., holes of identical sizes) to reduce selective hole diameters by different amounts. As a specific example of a hole diameter variance arrangement, hole diameters may differ based on a longitudinal position of the hole, with holes at the same longitudinal position having the same diameter. Such an arrangement may generally match the friction gradient around a reciprocating component. This is because the magnitude of friction forces acting on a reciprocating component may be greatest directly beneath the reciprocating component and decrease moving away from this point at approximately the same rate, whether moving in a clockwise or counterclockwise direction.

Thus, in the depicted embodiment: the diameter HD4 of hole 412(4) may be larger than any other hole diameters: the diameters HD3 and HD5 of holes 412(3) and 412(5) may be approximately equal and may be the second largest (e.g., one step down from diameter HD4); the diameters HD2 and HD6 of holes 412(2) and 412(6) may be approximately equal and may be the third largest (e.g., two steps down from diameter HD4); the diameters HD1 and HD7 of holes 412(1) and 412(7) may be approximately equal and may be the fourth largest (e.g., three steps down from diameter HD4); and the diameter HD8 of holes 412(8) may be the smallest (e.g., four steps down from diameter HD4). For example, HD4 may be approximately 0.25 inches, HD3 and HD5 may be approximately 0.22 inches, HD2 and HD6 may be approximately 0.20 inches, HD1 and HD7 may be approximately 0.16 inches, and HD8 may be approximately 0.12 inches. Alternatively, all or some of holes 412(1)-412(8) may have different diameters. That is, all or some of the diameters HD1-HD8 may be different, in any desired pattern or arrangement.

Moreover, while the Figures generally depict holes 412(1)-412(8) as straight holes (i.e., constant diameter holes), this is for simplicity and is not intended to be limiting. In other embodiments, one or more of the circumferentially spaced holes 412 can impart a swirl to a lubricant, can increase or decrease in diameter over a length of a hole (e.g., to create a Venturi or Venturi-type effect), and/or may vary in any other manner now known or developed hereafter. Generally, smaller holes may restrict flow and, thus, will allow less lubricant to pass therethrough. Then, lubricant that is unable to flow through a hole will divert around the lubricant groove 410 towards a next hole (since the lubricant groove 410 offers a path of less resistance) and/or create backpressure in the lubricant groove 410. This naturally diverts lubricant to larger holes, which offer a path of less resistance as compared to smaller holes. Thus, when a sufficient amount of lubricant is supplied to lubricant groove 410 at a sufficient pressure, the groove 410 will naturally tend to divert lubricant around a packing assembly before the lubricant can flow radially inwards through all of the circumferentially spaced holes 412. In view of this, for the purposes of this application, diverting may be described as occurring prior to a delivery of the lubricant to the interior surface of the packing assembly.

Still referring to FIG. 2, when the lantern ring 356 diverts and meters flows of lubricant (from a single channel 302 or from multiple channels, in the manner described below), the alignment of the lantern ring 356 within the stuffing box 300 will be critical. This is because the alignment of the lantern ring 356 within the stuffing box 300 ensures that larger holes of the circumferentially spaced holes 412 are aligned with higher friction areas on the interior surface 351 of the packing assembly 350. To solve this problem, at least some lantern rings presented herein may include an alignment element 420 configured to position the lantern ring 356 in a specific rotational position within the stuffing box 300. For example, the alignment element 420 may ensure that hole 412(4) is positioned directly beneath a plunger 202, e.g., to align the largest hole 412(4) with the highest friction area on the interior surface 351 of the packing assembly 350. In the depicted embodiment, the alignment element 420 is a rod that is configured to engage a corresponding slot or keyway (not shown) included in the stuffing box 300. However, in other embodiments, any keying feature now know or developed hereafter may be used to position a lantern ring 356 with circumferentially spaced holes 412 of varied dimensions in a specific rotational position within a stuffing box 300.

Now turning to FIG. 5, this Figure illustrates another example embodiment of a fluid end 500 with which the techniques presented herein may be implemented. Fluid end 500 is substantially similar to fluid end 104 (of FIGS. 1 and 2), at least in terms of overall structure and function. Thus, any description of parts or functions of fluid end 104 included herein should be understood to apply like aspects of fluid end 500 and, for brevity, only differences between these embodiments are described in detail below (with different structural features being labeled with new part numbers in the figures).

Perhaps the most apparent differences are that the fluid end 500 of FIG. 5 is illustrated while fully assembled and in an opposite orientation (or from an opposite perspective) as compared to the fluid end 104 of FIG. 2. Since fluid end 500 is fully assembled, fluid end 500 includes: (1) a first valve assembly 5001 installed in segment 2126: (2) a second valve assembly 5002, a sealing assembly 5003; and a retaining element 5004 installed in segment 2124; and (3) a sealing assembly 5005 and retaining element 5006 installed in segment 2224. However, these components are merely examples of sealing, valve, and retaining assemblies and could be replaced or modified across different embodiments. Moreover, any such components, or variations thereof, could also be installed in fluid end 104.

On the other hand, for the purposes of this application, one of the most notable differences is that the fluid end 500 is a multi-part casing that includes a secondary component, which may also be referred to as stuffing box assembly 502. This stuffing box assembly 502 is partially depicted in FIG. 5 and fully depicted in FIGS. 6-8 and includes a casing portion 505 that is removably coupleable to the casing 206 of the fluid end 104. The casing portion 505 also at least partially defines a stuffing box 504. Despite the different manner in which the stuffing box 504 is formed, the lantern ring 356 of previously described embodiments may still be installed therein to divert and meter lubricant flows to an interior surface 351 of packing assembly 350. Alternatively, other lantern ring embodiments, such as a conventional lantern ring with evenly spaced holes of equal sizes or a lantern ring 600 with zones (described below), can be installed therein to implement the techniques presented herein. In any case, critically, the stuffing box assembly 502 now includes a plurality of lubricant delivery channels 540.

Figure 6:
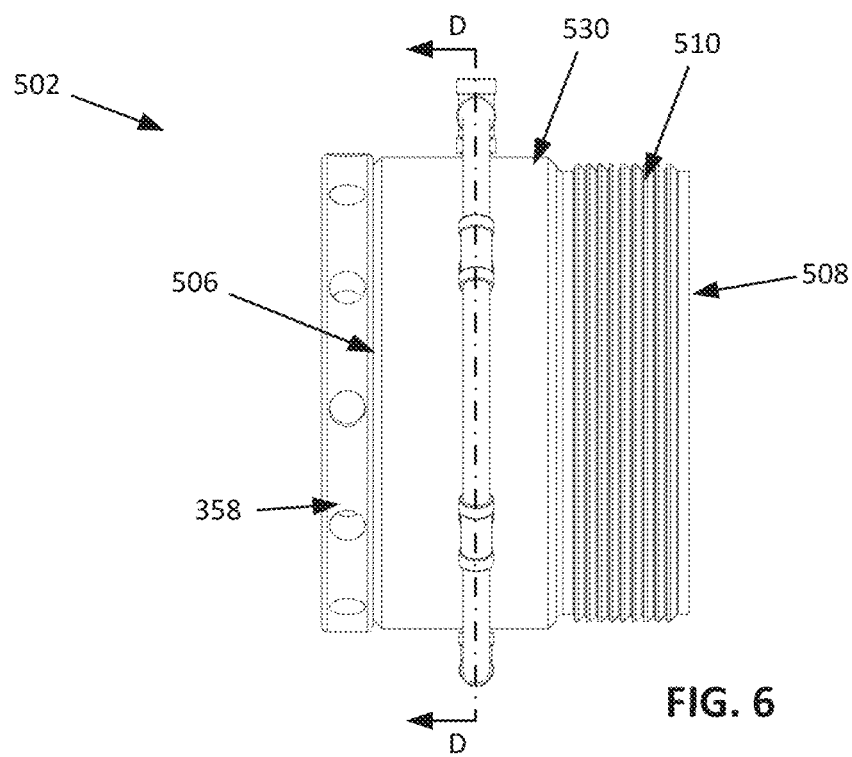
FIG. 6 is a side view of an example embodiment of a stuffing box assembly that may be included in the fluid end of FIG. 5, the stuffing box assembly being formed in accordance with the techniques presented herein.
Figure 7:
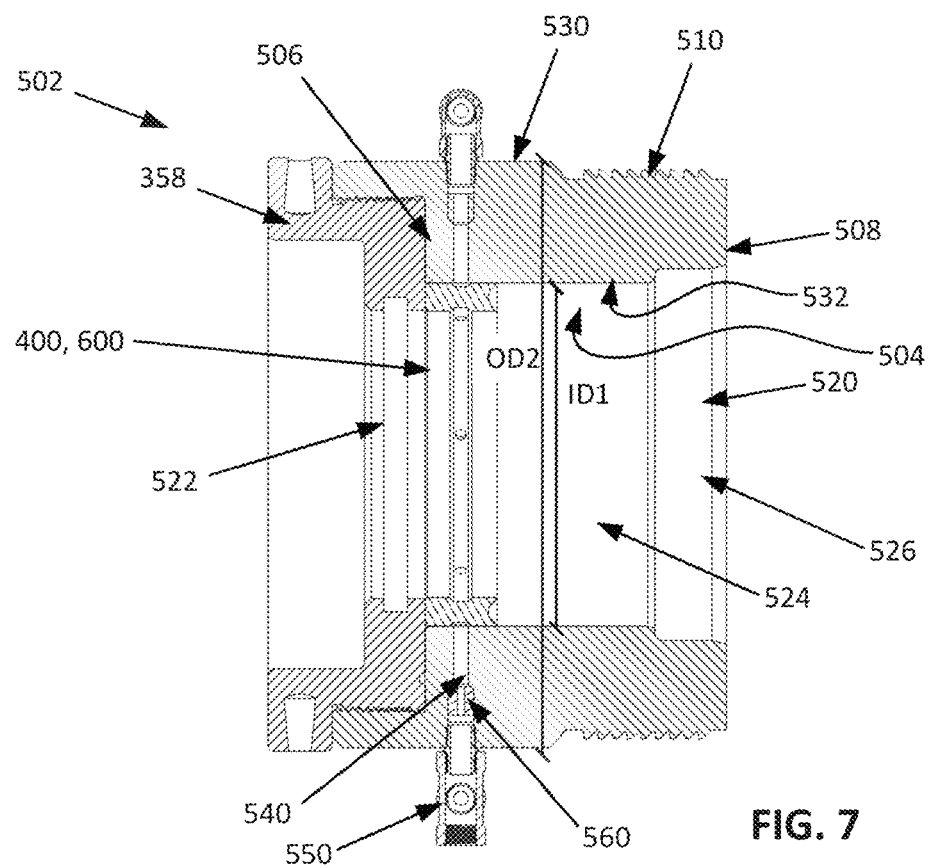
FIG. 7 is a side, cross sectional view of the stuffing box assembly of FIG. 6.
Figure 8:
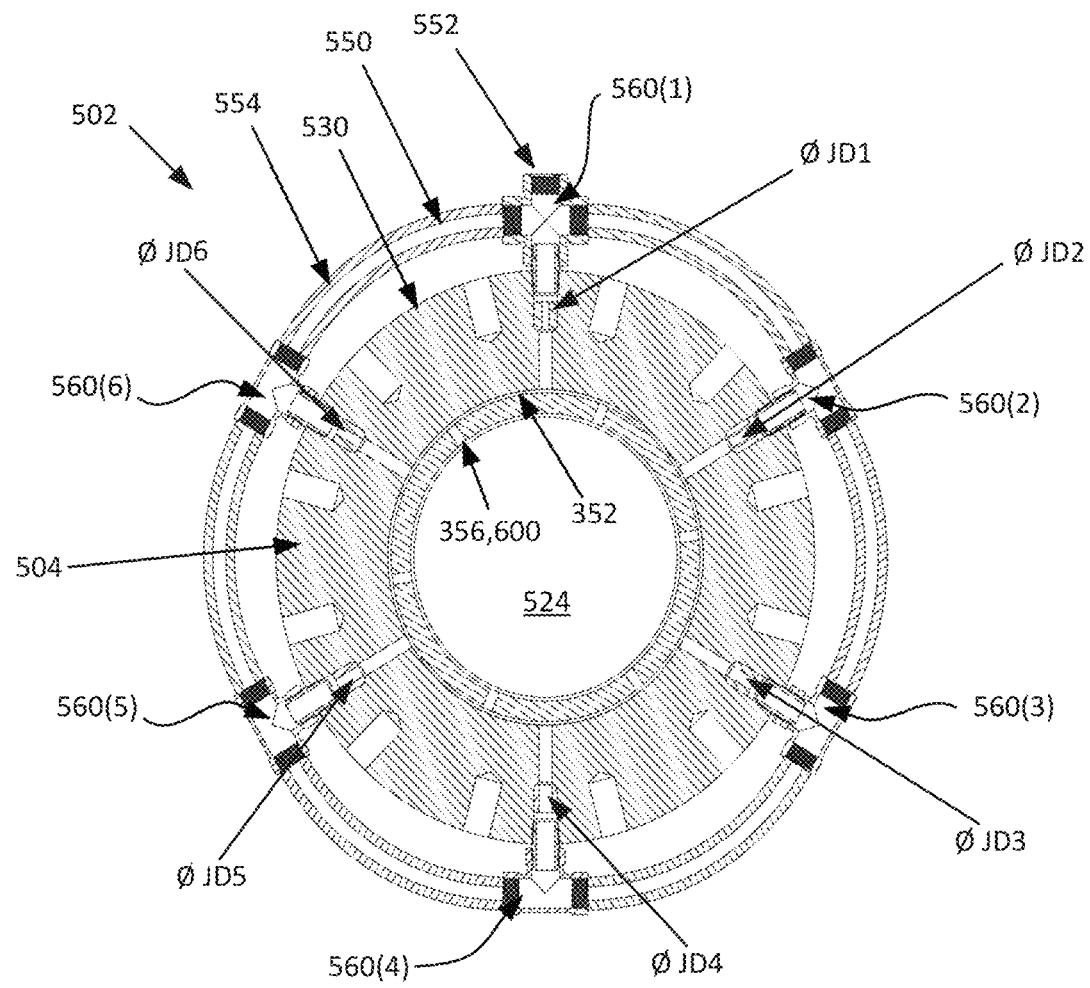
FIG. 8 is a cross sectional view of the stuffing box assembly of FIG. 6 taken along line D-D of FIG. 6

FIGS. 6-8 depict the stuffing box assembly 502 in further detail. Overall, the stuffing box assembly 502 includes the casing portion 505 and a manifold 550. The casing portion 505 extends from a downstream end 506 to an upstream end 508. In the depicted embodiment, the upstream end 508 includes threads 510 configured to removably engage corresponding threads included on an external surface 210 of the casing 206. However, other embodiments could include any desirable feature to provide a removable coupling between the casing portion 505 and the casing 206. Additionally, in the depicted embodiment, the casing portion 505 defines a single bore 520. Thus, with the depicted embodiment, multiple casing portions 505 may be coupled to the casing 206 to fully assemble a multi-chamber fluid end. For simplicity, the foregoing description describes this single bore casing portion 505, but in other embodiments, casing portion 505 might define any number of bores. Thus, any description of a single bore casing portion 505 included herein should not be interpreted as limiting in any manner.

In the depicted embodiment, a plunger bore is collectively defined by bore 520 and segment 2226. Additionally, the bore 520 at least partially defines the stuffing box 504 in which a packing assembly 350 may be installed. More specifically, the casing portion 505 includes a lateral outer surface 530 with an outer diameter OD2 and an inner surface

532 with an inner diameter ID2 that each extend at least partially between the downstream end 506 and the upstream end 508 of the casing portion 505. The inner surface 532 defines the bore 520 so that the bore includes: (1) a first section 522 extending from the downstream end 506 of the casing portion 505: (2) a third section 526 extending from the upstream end 508; and (3) a second section 524 disposed between the first section 522 and the third section 526. As can be seen in FIGS. 5 and 7, the second section 522 is generally configured to define the stuffing box 504 while the first section 522 and third section 526 are configured to receive a retaining element 358 and stop element 535 that axially constrain (i.e., axially sandwich) a packing assembly 350 installed in the stuffing box 504.

As is shown best in FIG. 8, which is a sectional view of stuffing box assembly 502 taken along line D-D of FIG. 6, the lubricant delivery channels 540) extend from the lateral outer surface 530) to the inner surface 532. Additionally, channels 540 are axially arranged to deliver lubricant to the stuffing box 504 (and, specifically, to a lantern ring 400,600 installed therein). That is, in the depicted embodiment, the casing portion 505 includes circumferentially spaced channels 540) configured to deliver lubricant to a lantern ring of a packing assembly. In the depicted embodiment, this is achieved with a casing portion 505 that includes six circumferentially spaced channels 540(1)-(6).

In FIG. 8, the channels 540(1)-(6) have substantially similar dimensions, but in other embodiments (e.g., FIG. 9), the channels 540(1)-(6) have varied dimensions so that the circumferentially spaced channels 540(1)-(6) meter flows of the lubricant along multiple radial flow paths at different flow rates. However, other embodiments need not have six channels and can have any number of channels. Moreover, in the depicted embodiment, the six circumferentially spaced channels 540(1)-(6) are evenly spaced around the casing portion 505 (e.g., approximately 60) degrees between channels), but other embodiments need not include even spacing and can include any desired spacing.

Still referring to FIGS. 6-8, in the depicted embodiment, the manifold 550) is an annular manifold that extends entirely around the casing portion 505: however, in other embodiments, the manifold 550 may extend around only a portion of the casing portion 505. Additionally or alternatively, in some embodiments, the manifold 550 may extend through/within a portion of the casing portion 505. In any case, the manifold 550 is configured to deliver lubricant to a lantern ring installed within the casing portion 505 (e.g., lantern ring 600) via the plurality of channels 540 in the casing portion 505. Moreover, and perhaps most importantly, in the embodiment of FIG. 6-8, the manifold 550 is configured to divert and meter lubricant flows at different rates.

More specifically, in the embodiment of FIG. 6-8, the manifold 550) includes a supply tube 552 that delivers lubricant to annular tubing 554 and a plurality of injectors 560 are circumferentially spaced along the annular tubing 554. However, to be clear, for the purposes of this application, the term "injector" does not require or imply that such a part injects, pushes, or propels a lubricant in any way. Instead, the term "injector" is used to denote a part, component, or portion of a manifold assembly that introduces lubricant to radially inwardly extending flow paths.

In the depicted embodiment, the manifold 550 includes six injectors 560(1)-560(6) with varied dimensions. In some instances, injector orifice diameters may differ based on a longitudinal position of the injector, with injectors at the same longitudinal position having the same orifice diameter. Such an arrangement may generally match the friction gradient around a reciprocating component, as is described above. Thus, in the depicted embodiment: the orifice diameter JD4 of injector 560(4) may be larger than any other injector orifice diameters; the orifice diameters JD3 and JD5 of injectors 560(3) and 560(5) may be approximately equal and may be the second largest (e.g., one step down from orifice diameter JD4); the orifice diameters JD2 and JD6 of injectors 560(2) and 560(6) may be approximately equal and may be the third largest (e.g., two steps down from orifice diameter JD4); and the orifice diameter JD6 of injector 560(6) may be the smallest (e.g., three steps down from orifice diameter JD4). For example, JD4 may be approximately 0.25 inches, JD3 and JD5 may be approximately 0.21 inches, JD2 and JD6 may be approximately 0.17 inches, and JD6 may be approximately 0.13 inches.

Alternatively, all or some of injectors 560(1)-560(6) may have different orifice diameters. In any case, when injectors 560(1)-560(6) have different orifice diameters, these diameters may be created by utilizing injectors 560 with different dimensions and/or by inserting orifice plugs of different dimensions, or another such element/part, into injectors 560. In fact, although not shown, in some embodiments one or more of the orifice diameters may be "dynamic" so that the orifice size can change. For example, an injector 560 may include a valve configured to open or close different amounts to create different orifice/diameter sizes. By comparison, a fixed orifice/diameter size, e.g., formed with dimensioning/machining of injectors and/or an orifice plug, may be referred to as a static orifice/diameter size.

Regardless of the exact configuration and sizes of the injectors, the injectors may divert and meter flows of lubricant for the same reasons discussed above in connection with the holes 412(1)-412(8) of lantern ring 356 (e.g., of FIGS. 3 and 4). That is, the arrangement of the tubing, the injector size, and/or the pressure and amount of lubricant delivered to the manifold 550 will divert lubricant around at least a portion of the casing portion 505 "before" the lubricant can flow radially inwards through all of the circumferentially spaced injectors 560. Alternatively, in some embodiments, the diverting and metering may occur upstream of the injectors in the manifold 550. For example, tubing 554 (alone or in combination with additional tubing) might meter lubricant while diverting the lubricant. As another example, the metering and diverting might occur upstream of injectors 560 and individual lines of tubing with metered flows might run to the injectors 560.

Thus, in at least some embodiments, the manifold 550 can create and deliver flows of lubricant metered at different rates to the interior surface of a packing assembly, regardless of the sizes of holes included on a lantern included in the packing assembly. That is, in at least some embodiments, the manifold 550 can execute the techniques presented herein in combination with the lantern ring 356 (of FIGS. 3 and 4) or with a conventional lantern ring (e.g., a lantern ring with equally sized holes). Advantageously, this may allow an end user to retrofit a current fluid end to provide a gradient of lubricant flows that matches a gradient of friction forces without modifying the lantern ring included therein. Moreover, using the manifold assembly to provide such a gradient of lubricant flows may require limited machining operations (since the lantern ring need not be machined to include holes of varied dimensions) and/or parts (e.g., there may be no need for orifice plugs).

Figure 9:
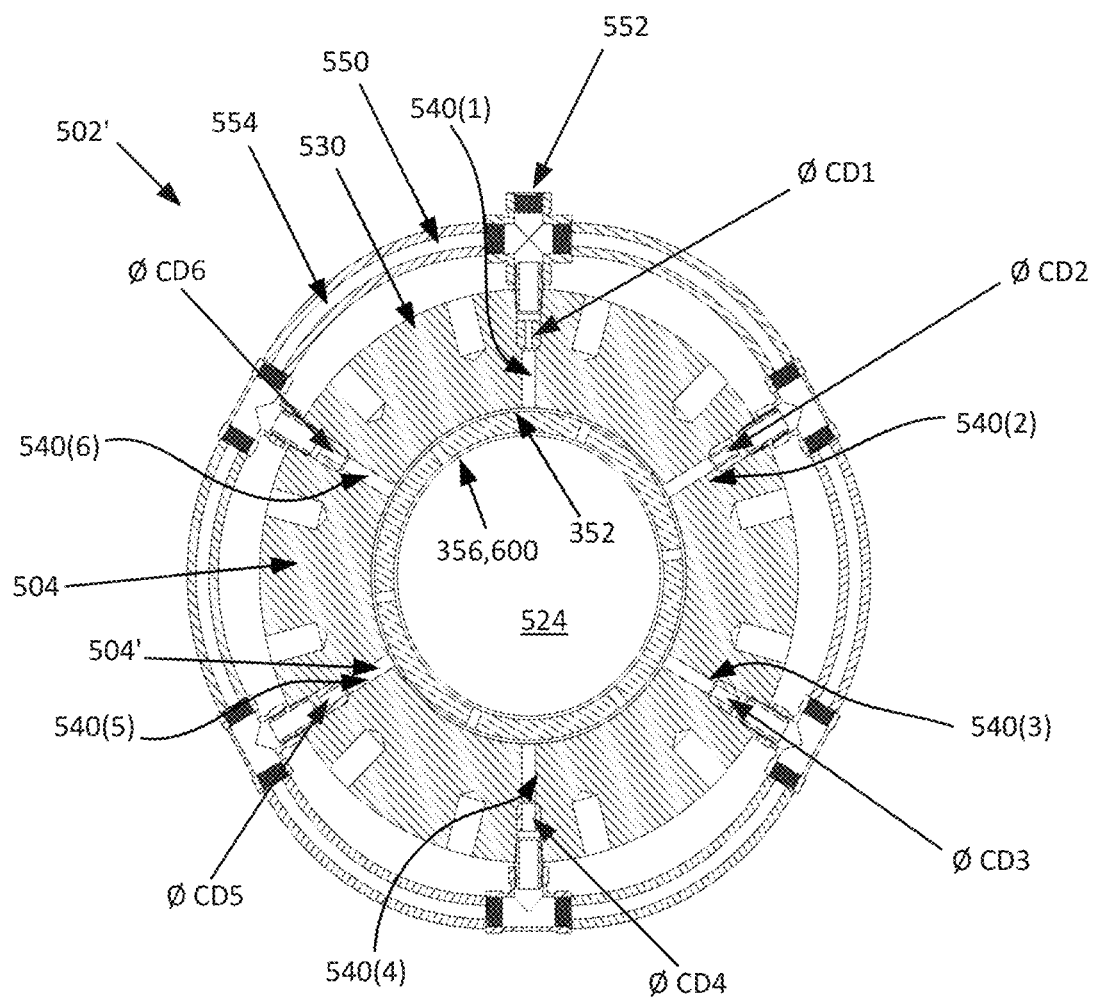
FIG. 9 is a cross sectional view of another example embodiment of a stuffing box assembly that is a variant of the stuffing box assembly of FIGS. 6-8, the cross sectional view taken along the same sectional view as FIG. 8.

Still further, and now turning to FIG. 9, in some embodiments, the dimensions of the channels 540) included in the casing portion 505 might be varied to provide a gradient of lubricant flows that matches a gradient of friction forces. FIG. 9 illustrates a stuffing box assembly 502' with such channels 540)'. The varied channels 540' can be used instead of or in combination with injectors 560 of varied dimensions (e.g., of FIGS. 6-8) and/or lantern ring holes 412 of varied dimensions (e.g., of FIGS. 3 and 4). In the depicted embodiment, the casing portion 505 includes six channels 540(1)-540(6) with varied dimensions. In some instances, the channel diameters may differ based on a longitudinal position of the channel, with channels at the same longitudinal position having the same diameter which, as mentioned, may generally match the friction gradient around a reciprocating component.

Thus, in the depicted embodiment: the diameter CD4 of channel 540(4) may be larger than any other channel diameters; the diameters CD3 and CD5 of channels 540(3) and 540(5) may be approximately equal and may be the second largest (e.g., one step down from diameter CD4); the diameters CD2 and CD6 of channels 540(2) and 540(6) may be approximately equal and may be the third largest (e.g., two steps down from diameter CD4); and the diameter CD1 of channel 540(1) may be the smallest (e.g., three steps down from diameter JD4). For example, CD4 may be approximately 0.25 inches, CD3 and CD5 may be approximately 0.21 inches, CD2 and CD6 may be approximately 0.17 inches, and CD1 may be approximately 0.13 inches.

Alternatively, all or some of channels 540(1)-540(6) may have different diameters. In any case, when channels 540(1)-540(6) have different orifice diameters, these diameters may be created by utilizing channels 540 with different dimensions (e.g., machined to have different dimensions) and/or by inserting orifice plugs of different dimensions, or another such element/part, into channels 540. Still further, while the Figures generally depict channels 540(1)-(6) as straight channels (i.e., constant diameter channels), this is for simplicity and is not intended to be limiting. In other embodiments, one or more of the channels 540(1)-(6) can impart a swirl to a lubricant, can increase or decrease in diameter over a length of a channel (e.g., to create a Venturi or Venturi-type effect), and/or vary in any other manner now known or developed hereafter. Channels 540 could also be dynamic or static, if desired.

In at least some embodiments, the casing portion 505 can create and deliver flows of lubricant metered at different rates to the interior surface of a packing assembly, regardless of the sizes of holes included on a lantern included in the packing assembly. That is, the casing portion 505 can execute the techniques presented herein in combination with the lantern ring 356 (of FIGS. 3 and 4) or with a conventional lantern ring (e.g., a lantern ring with equally sized holes). Typically, casings or casing portions of fluid ends last longer than elements of a packing installed therein (e.g., a lantern ring). Consequently, executing the techniques presented herein with a casing portion may allow a fluid end to accurately provide metered lubricant delivery over a longer lifespan as compared to executions of the techniques presented herein that utilize varied holes of a lantern ring.

In fact, generally, executing the metered lubricant techniques presented herein with a stuffing box assembly 502, whether with the casing portion 505 and/or the manifold 550 may meter fluids with consistent accuracy over the lifespan of the casing portion 505. It may also eliminate any alignment requirements. That is, a lantern ring can be positioned in any rotational position when the metered lubricant techniques presented herein are executed primarily with a stuffing box assembly 502. This is because the flows of lubricant will be delivered to different radial portions of a lantern ring at different flow rates and the lubricant will then flow through the nearest hole at a similar flow rate, although there may be some mixing/smoothing of fluid moving between the holes.

Figure 10:
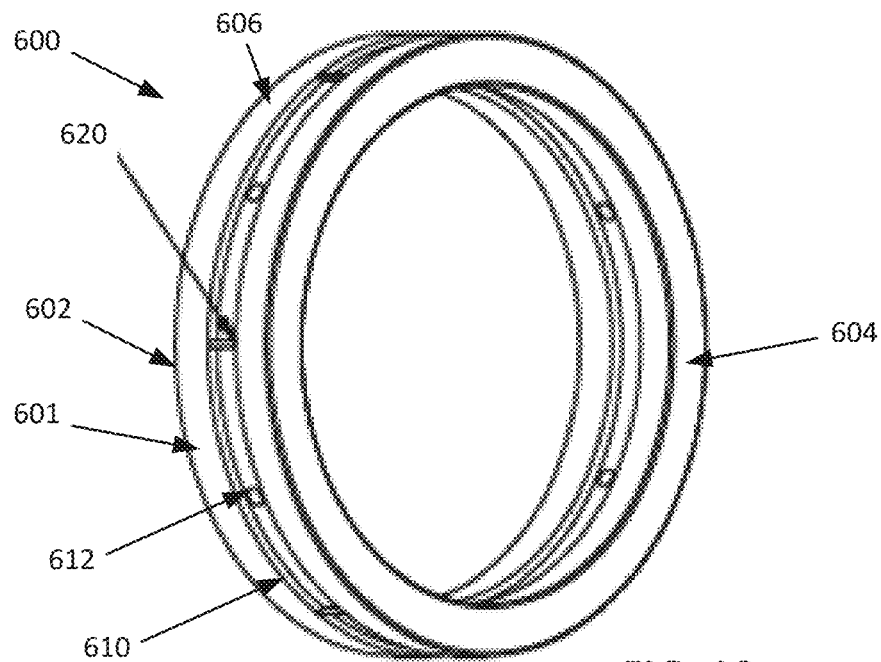
FIG. 10 is a perspective view of a lantern ring that may be included in a packing assembly installed in the stuffing box assembly of FIG. 8 or FIG. 9, according to an example embodiment.

Now turning to FIG. 10, to eliminate or reduce the mixing/smoothing between the lantern ring holes, some embodiments may use a lantern ring 600 that defines radial zones. The overall construction of lantern ring 600 is similar to that of lantern ring 356 in that it includes a main body 601 defined, at least in part, by a lateral surface 606 that extends from an downstream end 602 to an upstream end 604. Additionally, the lantern ring 600 is similar to that of lantern ring 356 because it includes a lubricant groove 610 with circumferentially spaced holes 612. However, now; the circumferentially spaced holes 612 all have the same dimensions, and are divided into separated radial zones Z1-Z6. Specifically, in the depicted embodiment, radially extending walls 620 are disposed between the circumferentially spaced holes 612. Thus, when lubricant is delivered to a radial zone at a certain flow rate, this lubricant will not mix with lubricant delivered to other radial zones at different flow rates. This will create different amounts of backpressure in different radial zones, which will then cause lubricant to flow through the circumferentially spaced holes 612 at different, and clearly delineated, flow rates.

Figure 11:
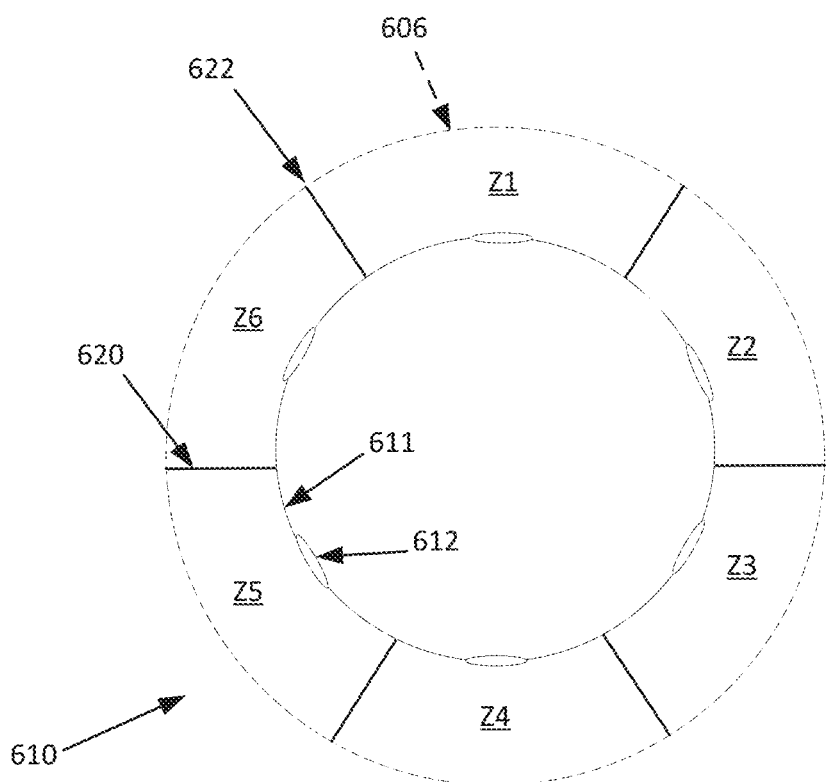
FIG. 11 is a schematic drawing of a groove included in the lantern ring of FIG. 10.

Still referring to FIG. 10, but now in combination with FIG. 11, which is a schematic illustration of the groove 610 included in lantern ring 600, in the depicted embodiment, each of the circumferentially spaced holes 612 is disposed in its own zone. That is zones Z1-Z6 each include one hole of the circumferentially spaced holes 612. However, in other embodiments, any number of circumferentially spaced holes 612 could be included in any zone (e.g., with zone Z1 having two holes, zone Z2 having one, zone Z3 having three, etc.).

Moreover, in the depicted embodiment, the walls 620 extend entirely through the lubricant groove 610, from a bottom 611 of the lubricant groove 610 to the lateral surface 606 of the lantern ring 600 (e.g., so that an exterior edge 622 of each wall 620 aligns with the lateral surface 606). Thus, zones Z1-Z6 are each fully separated or segregated from each other. However, in other embodiments, the walls 620 might only extend through a portion of the depth of the lubricant groove 610, such that the exterior edge 622 of each wall 620 is radially interior of the lateral surface 606. Such embodiments may allow limited mixing, but might improve tolerancing and can limit the damage that might be caused by a clog in a channel 540 or injector 560 of the casing portion 505 or manifold 550, respectively.

To be clear, although FIGS. 10 and 11 depict a lantern ring 600 with circumferentially spaced holes 612 of approximately equal dimensions, the concept of radially extending walls may also be used with lantern rings that have circumferentially spaced holes of different dimensions. For example, walls 620 might also be included in the lantern ring 356 of FIGS. 3 and 4, as well as variations thereof. However, the walls 620 should not fully partition a lubricant groove unless a stuffing box assembly in which the lantern ring is included can deliver lubricant to different radial zones because full partitioning would prevent lubricant delivered at a single radial location (e.g., via a single channel, such as channel 302 of FIG. 2) from being diverted around a bore and/or packing assembly.

While the techniques presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments (and need not be limited to the specific combinations explicitly disclosed). For example, while the injectors are described as potentially being dynamic or static, any structure forming a radial flow channel for the techniques presented herein (e.g., a channel, a hole, etc.) might also be dynamic or static. Accordingly, it is appropriate that the appended claims be construed broadly and in a manner consistent with the scope of the disclosure as set forth in the following claims.

Similarly, it is intended that the present application cover the modifications and variations that come within the scope of the appended claims and their equivalents. For example, it is to be understood that terms such as "left," "right." "top." "bottom," "front," "rear." "side," "height." "length." "width." "upper." "lower," "interior," "exterior," "inner." "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Moreover, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially." Finally, for the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

What is claimed is:

1. A method of delivering lubricant to a packing assembly of a fluid end of a reciprocating pump, the method comprising:
    delivering lubricant to a stuffing box that is housing the packing assembly or to a manifold disposed in or around the stuffing box, the lubricant configured to decrease friction between an interior surface of the packing assembly and a reciprocating component moving along the interior surface;
    prior to delivering the lubricant to the interior surface of the packing assembly, diverting the lubricant to multiple radial flow paths circumferentially spaced around a bore in which the packing assembly is disposed, the multiple radial flow paths leading to the interior surface of the packing assembly; and
    metering flows of the lubricant along the multiple radial flow paths at different flow rates based on a friction gradient across the interior surface of the packing assembly.

2. The method of claim 1, wherein the diverting comprises diverting the lubricant around the packing assembly with a manifold assembly that extends around at least a portion of the bore.

3. The method of claim 2, wherein the metering comprises metering the lubricant with injectors included in the manifold assembly, the injectors being circumferentially spaced around the packing assembly and having different orifice diameters to create the different flow rates for the multiple radial flow paths.

4. The method of claim 2, wherein the metering comprises metering the lubricant with channels of the stuffing box, the channels being circumferentially spaced around the bore in which the packing assembly is disposed and having different diameters to create the different flow rates for the multiple radial flow paths.

5. The method of claim 2, wherein the metering comprises metering the lubricant with holes of a lantern ring included in the packing assembly, the holes being circumferentially spaced around the lantern ring and having different diameters to create the different flow rates for the multiple radial flow paths.

6. The method of claim 1, wherein:
    the diverting comprises diverting the lubricant around the packing assembly with a lantern ring included in the packing assembly; and
    the metering comprises metering the lubricant with holes of the lantern ring, the holes being circumferentially spaced around the lantern ring and having different diameters to create the different flow rates for the multiple radial flow paths.

7. The method of claim 1, wherein the diverting directs the lubricant into zones circumferentially spaced around a lantern ring included in the packing assembly, wherein each of the zones includes one or more of the multiple radial flow paths.

8. A manifold assembly configured to deliver lubricant to a stuffing box of a fluid end of a reciprocating pump, the manifold assembly comprising:
    tubing disposed around at least a portion of a bore of the stuffing box in which a packing assembly is disposed, the tubing being configured to divert the lubricant to multiple radial flow paths circumferentially spaced around the bore, wherein the multiple radial flow paths lead to an interior surface of the packing assembly, and the lubricant is configured to decrease friction between the interior surface of the packing assembly and a reciprocating component moving along the interior surface; and
    a plurality of injectors that fluidly couple the tubing to the multiple radial flow paths, wherein the plurality of injectors or the multiple radial flow paths meter flows of the lubricant at different flow rates based on a friction gradient across the interior surface of the packing assembly.

9. The manifold assembly of claim 8, wherein at least two injectors of the plurality of injectors have different orifice diameters to meter the flows of the lubricant at the different flow rates.

10. The manifold assembly of claim 9, wherein the at least two injectors include a first injector with a first orifice diameter and a second injector with a second orifice diameter that is smaller than the first orifice diameter, the first injector being disposed at a position longitudinally below a position of the second injector.

11. The manifold assembly of claim 10, wherein the second position is directly beneath the reciprocating component.

12. The manifold assembly of claim 8, wherein the tubing is annular tubing.

13. A stuffing box assembly, comprising:
a casing portion defining the bore in which the packing assembly may be installed;
a plurality of channels formed in the casing portion and circumferentially spaced around at least a portion of the bore to define the multiple radial flow paths; and
the manifold assembly of claim 8.

14. The stuffing box assembly of claim 13, wherein at least two channels of the plurality of channels have different diameters to meter the flows of lubricant at the different flow rates.

15. The stuffing box assembly of claim 14, wherein the at least two channels include a first channel with a first diameter and a second channel with a second diameter that is smaller than the first diameter, the first channel being disposed at a position longitudinally below a position of the second channel.

16. The stuffing box assembly of claim 15, wherein the second position is directly beneath the reciprocating component.

17. A lantern ring for a packing assembly configured to be installed in a stuffing box of a fluid end of a reciprocating pump, the lantern ring comprising:

a main body with a lateral surface disposed between an upstream end of the lantern ring and a downstream end of the lantern ring; and a plurality of holes circumferentially spaced around the lateral surface, each hole of the plurality of holes defining a radial flow path to an interior surface of the lantern ring that is configured to direct a lubricant to an interior surface of the packing assembly, the lubricant being configured to decrease friction between the interior surface of the packing assembly and a reciprocating component moving along the interior surface, wherein at least two holes of the plurality of holes have different diameters so that the at least two holes meter flows of the lubricant at different flow rates.

18. The lantern ring of claim 17, wherein the at least two holes are arranged based on a friction gradient across the interior surface of the packing assembly.

19. The lantern ring of claim 17, further comprising:
a groove disposed in the lateral surface, wherein the plurality of holes is formed in the groove.

20. The lantern ring of claim 19, further comprising:
a plurality of walls that divide the groove into radial zones, each of which includes one or more holes of the plurality of holes.

* * * * *